United States Patent
Johnson et al.

[11] Patent Number: 5,434,910
[45] Date of Patent: Jul. 18, 1995

[54] METHOD AND SYSTEM FOR PROVIDING MULTIMEDIA SUBSTITUTION IN MESSAGING SYSTEMS

[75] Inventors: William J. Johnson, Flower Mound; Michael D. Smith, Euless; Marvin L. Williams, Lewisville, all of Tex.

[73] Assignee: International Business Machines Corporation, Armonk, N.Y.

[21] Appl. No.: 965,097

[22] Filed: Oct. 22, 1992

[51] Int. Cl.6 .................. H04M 1/64; H04M 11/00
[52] U.S. Cl. ......................... 379/89; 379/67; 379/88; 379/68; 379/93
[58] Field of Search ............... 379/67, 88, 89, 68, 379/93, 85, 95

[56] References Cited

U.S. PATENT DOCUMENTS

| | | | |
|---|---|---|---|
| 4,625,081 | 11/1986 | Lotito et al. | 379/88 |
| 4,837,798 | 6/1989 | Cohen et al. | 379/88 |
| 4,837,807 | 1/1989 | Szeto et al. | 379/67 |
| 4,931,950 | 6/1990 | Isle et al. | 364/513 |
| 4,941,167 | 7/1990 | Cannalte et al. | 379/67 |
| 5,008,926 | 4/1991 | Misholi | 379/94 |
| 5,251,251 | 10/1993 | Barber et al. | 379/88 |
| 5,276,731 | 1/1994 | Arbel et al. | 379/88 |
| 5,329,578 | 7/1994 | Brennan et al. | 379/88 |

FOREIGN PATENT DOCUMENTS 61-172472  8/1986  Japan .................. H04M 1/64

OTHER PUBLICATIONS

IBM Technical Disc. Bulletin vol. 30 No. 8, Jan. 1988 "Data Processing Center Autohelp Tool" pp. 453-454.
IBM Technical Disc. Bulletin vol. 29 No. 12, May 1987 "Mail Paging And Reminder Fowarding System" pp. 5201-5202.
IBM Technical Disc. Bulletin vol. 28, No. 12, May 1986 "Full Automatic Intercept System" pp. 5429-5430.
IBM Technical Disc. Bulletin vol. 26 No. 6, Nov. 1983, W. S. Rosenbaum "General-Usage Remote-Access Storage and Forward Mesage Handling" p. 3071.
IBM Technical Disc. Bulletin vol. 25 No. 7A, Dec. 1982, S. J. Boies et al. "User Interface For Audio Communication System" pp. 3371-3377.

*Primary Examiner*—James L. Dwyer
*Assistant Examiner*—Fan Tsang
*Attorney, Agent, or Firm*—David A. Mims; Duke W. Yee; Andrew J. Dillon

[57] ABSTRACT

The present invention provides a method and system for creating a specific audio message for playback, in a data processing system. The data processing system has a multitude of diverse data types, and the audio message includes one or more audio segments and a presentation that is associated with one or more unique identifiers. Each of the unique identifiers includes a specification of a particular data type to be returned for presentation. The user is prompted to record one or more audio segments. One or more of the unique identifiers are associated with the audio segments. In response to a query from a caller or a signal from the data processing system, the audio message is automatically presented by presenting the audio segments and the presentation associated with the unique identifiers. The presentation is created by retrieving the data type and the location specified by unique identifiers from the data processing system.

17 Claims, 6 Drawing Sheets

METHOD AND SYSTEM FOR PROVIDING MULTIMEDIA SUBSTITUTION IN MESSAGING SYSTEMS

BACKGROUND OF THE INVENTION

1. Technical Field

The present invention relates in general to an improved phone messaging system and in particular to a method and a system for providing messages for playback. Still more particularly, the present invention relates to a method and a system for providing specific audible messages for playback.

2. Description of the Related Art

Employees in a company often need to keep in constant communication with other employees and with people outside of the company, such as customers or suppliers. Presently, data processing systems such as, voice mail or phone messaging systems are utilized to allow users of the system to create messages prompting callers to leave a message or to provide callers with alternate routes of communication with the user. These systems provide users with various methods for the users to record, in their own voice, a personalized message. Inconveniences occur, however, when a user desires to leave information that may change, i.e., an auxiliary phone number or special events occurring only on certain days.

Generally, personalized messages are preferred over messages generated by the system. Currently, available phone messaging systems require the user to enter a personalized prerecorded message. These personalized messages require continuous updating if helpful information such as a special event, the current date, an auxiliary phone number(s), and/or other special instructions are to be given to the caller receiving the message. As a result, a user must continually update the message in order to provide specific and up-to-date information in the message for playback.

Therefore, it would be desirable to have a phone messaging system that would provide a specific up-to-date message without having to rerecord the message each time a portion of the personalized information changes or becomes non-current.

SUMMARY OF THE INVENTION

It is therefore one object of the present invention to provide an improved phone messaging system.

It is another object of the present invention to provide a method and a system for providing dynamically modified messages for playback.

It is yet another object of the present invention to provide a method and a system for presenting specific audio messages for playback.

The foregoing objects are achieved as is now described. The present invention provides a method and system for creating a specific audio message for playback, in response to a query, in a data processing system. The data processing system has a multitude of diverse data types, and the specific audio message includes one or more audio segments and a presentation that is associated with one or more substitutions. An audio message is a specific message that may be presented in response to a call or that may be presented or distributed by a data processing system in response to a signal. Audio segments are prerecorded segments that may be combined with one or more audio phrases for presentation. Each audio phrase is associated with a unique identifier. Evaluation of these unique identifiers, as they are encountered in the specific audio message, produces various audio phrases that may be combined with one or more audio segments to form a specific message. The unique identifier also may be associated with other substitution identifiers or expressions. Unique identifiers may be multidependent to form nested layers. In this manner, complex audio messages may be presented.

Each of the unique identifiers includes a specification of a particular data type to be returned for presentation to the caller. These data types specify the type of audio phrase retrieved; i.e., text-to-speech, prerecorded, or system generated. The user may be prompted to record a message. One or more of the unique identifiers are associated with the audio segments. In response a query from a caller or to a signal, the audio message is automatically presented or distributed by presenting the audio segments and the presentation associated with the unique identifiers. The presentation is created by retrieving the data type specified by unique identifiers from the data processing system. The signal may be initiated, for example, by the user or the data processing system.

Additionally, the audio message may include an audio segment and two unique identifiers, wherein the first unique identifier includes a selected window of time during which the first unique identifier is valid. In response to a signal or a query by a caller a particular time, the audio message is automatically presented for playback by presenting the audio segment and presenting a phrase associated with the first unique identifier if the caller's query or the signal is within the window of time and presenting the phrase associated with the other unique identifier if the query is not within the window of time.

Furthermore, the data processing system for creating a specific audio message for playback in response to a query or a signal may include a multitude of diverse data types. Each of the unique identifiers includes a specification for a particular data type to be returned for presentation. In response to a query from a caller or a signal, the audio message is presented by presenting the audio segment and the presentation associated with the associated unique identifiers included in the audio message, wherein the presentation is created by retrieving the data type specified by the unique identifiers from the data processing system.

A unique identifier may be processed to determine validity by referring to an expression associated with the unique identifier.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
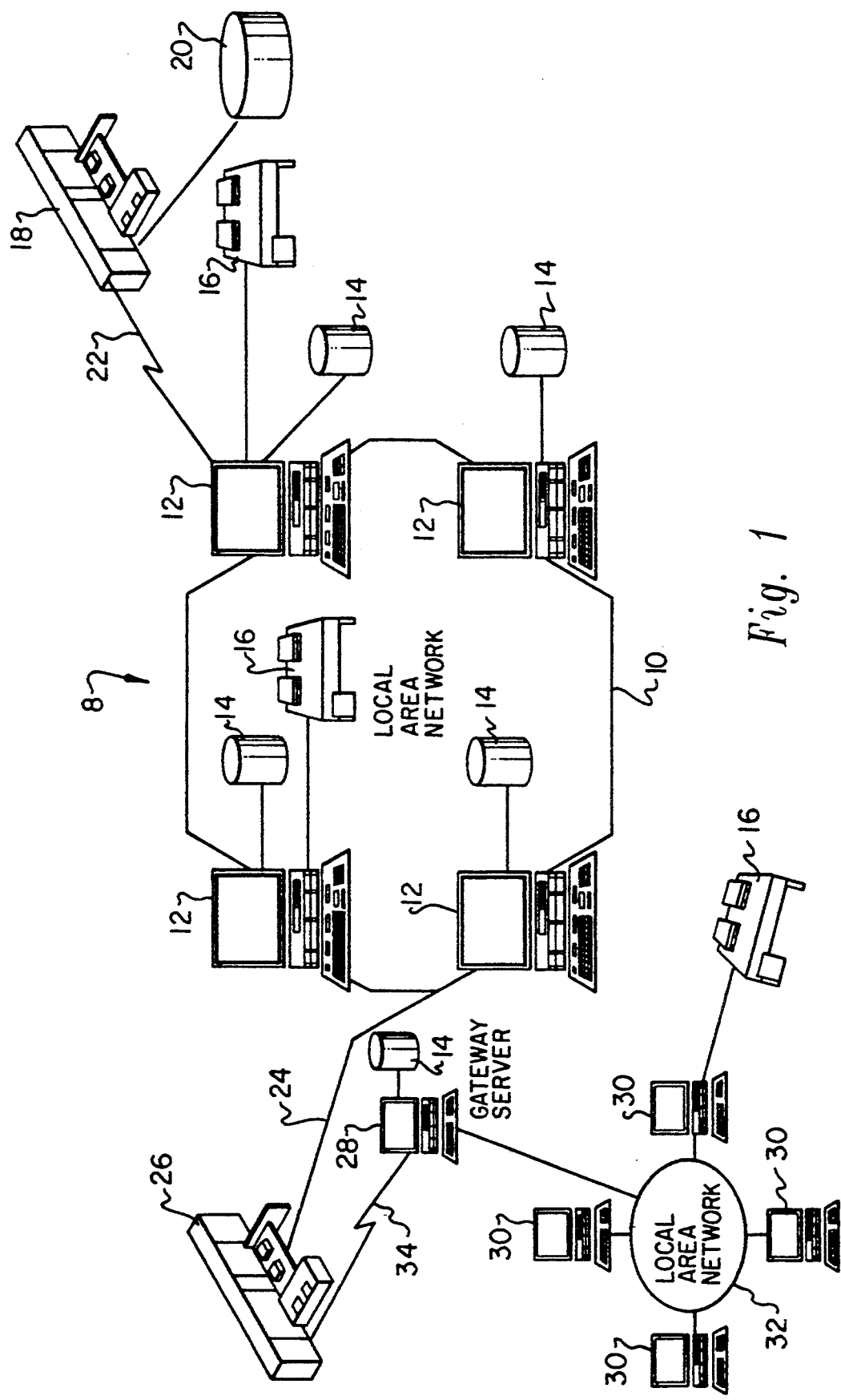
FIG. 1 depicts a pictorial representation of a data processing system, which may be utilized to implement a method and system of the present invention.

With reference now to the figures, and in particular with reference to FIG. 1, there is depicted a pictorial representation of a data processing system 8 which may be utilized to implement the method and system of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store documents or resource objects which may be periodically accessed by any user within data processing system 8. In a manner well known in the prior art, each such document or resource object stored within a storage device 14 may be freely interchanged throughout data processing system 8 by transferring a document to a user at an individual computer 12 or 30, for example.

Still referring to FIG. 1, it may be seen that data processing network 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10. Similarly, Local Area Network (LAN) 10 may be coupled via communications link 24 through a subsystem control unit/communications controller 26 and communications link 34 to a gateway server 28. Gateway server 28 is preferably an individual computer or Interactive Work Station (IWS) which serves to link Local Area Network (LAN) 32 to Local Area Network (LAN) 10.

As discussed above with respect to Local Area Network (LAN) 32 and Local Area Network (LAN) 10, a plurality of documents or resource objects may be stored within storage device 20 and controlled by mainframe computer 18, as Resource Manager or Library Service for the resource objects thus stored. Of course, those skilled in the art will appreciate that mainframe computer 18 may be located a great geographic distance from Local Area Network (LAN) 10 and similarly Local Area Network (LAN) 10 may be located a substantial distance from Local Area Network (LAN) 32. For example, Local Area Network (LAN) 32 may be located in California while Local Area Network (LAN) 10 may be located within Texas and mainframe computer 18 may be located in New York.

Although users within data processing system 8, send messages to each other via electronic mail systems, often times, users prefer to leave verbal messages. Users in data processing system 8, may communicate with each other via telephones, and a phone messaging system may be incorporated into data processing system 8. The phone messaging system may be embodied in a computer system, such as, for example, gateway server 28 within data processing system 8.

Figure 2:
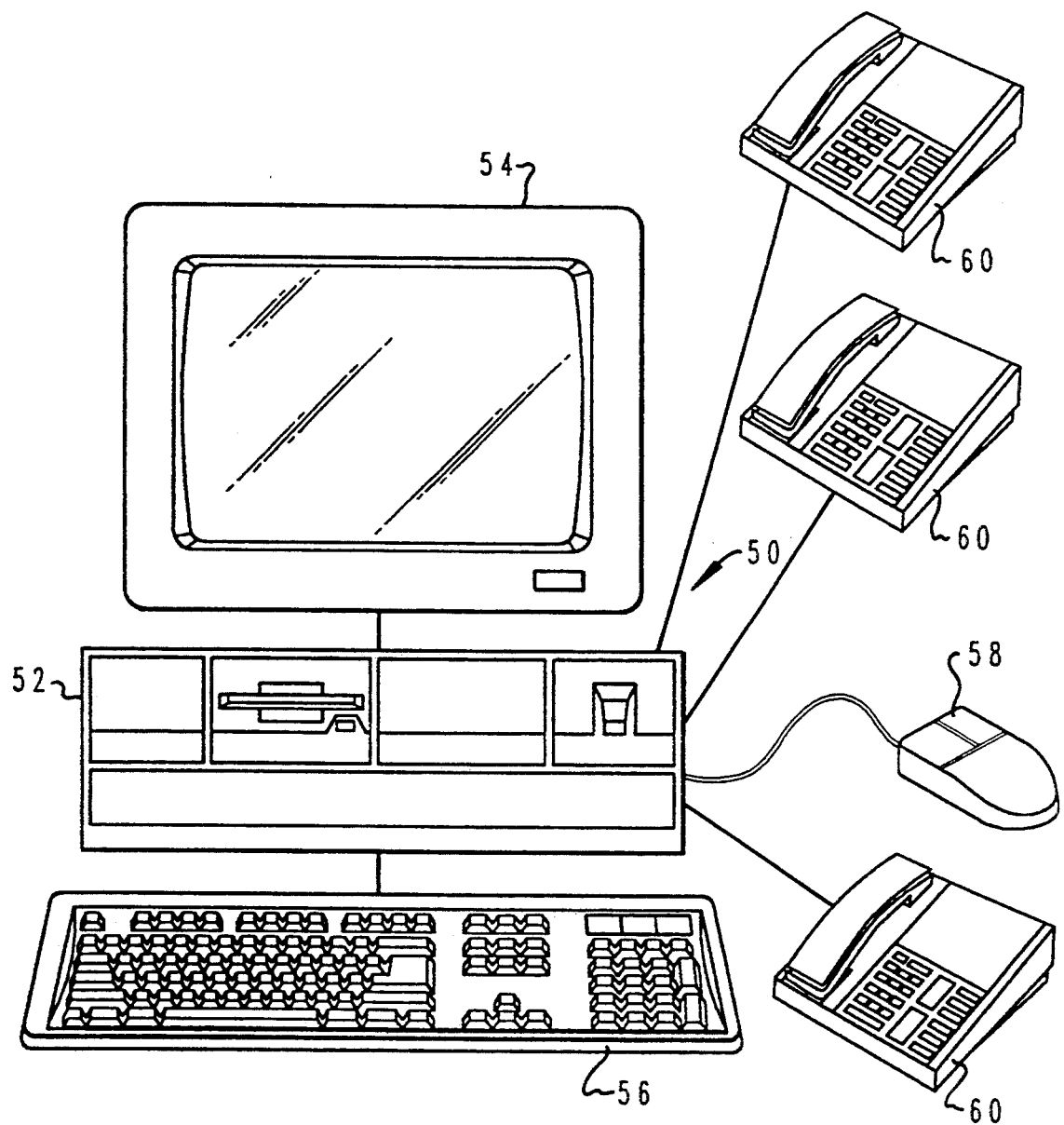
FIG. 2 is a pictorial representation of a personal computer in which the present invention may be implemented in accordance with a preferred embodiment of the present invention.

Referring now to FIG. 2, there is depicted a pictorial representation of a computer system in which the present invention may be implemented in accordance with a preferred embodiment of the present invention. A personal computer 50 is depicted which includes a system unit 52, a video display terminal 54, a keyboard 56, and a mouse 58. Telephones 60 or other voice communications devices may be coupled to personal computer 50 utilizing coupling systems well known in the art, wherein personal computer 50 may be utilized to control messages such a voice mail for various users in data processing system 8.

Personal computer 50 may be implemented utilizing any suitable computer such as, for example, an IBM "PS/2" computer, a product of International Business Machines Corporation. "PS/2" is also a registered trademark of International Business Machines Corporation. Although the depicted embodiment involves a personal computer, a preferred embodiment of the present invention may be implemented in other types of data processing systems, such as for example, intelligent work stations or mini-computers.

Figure 3:
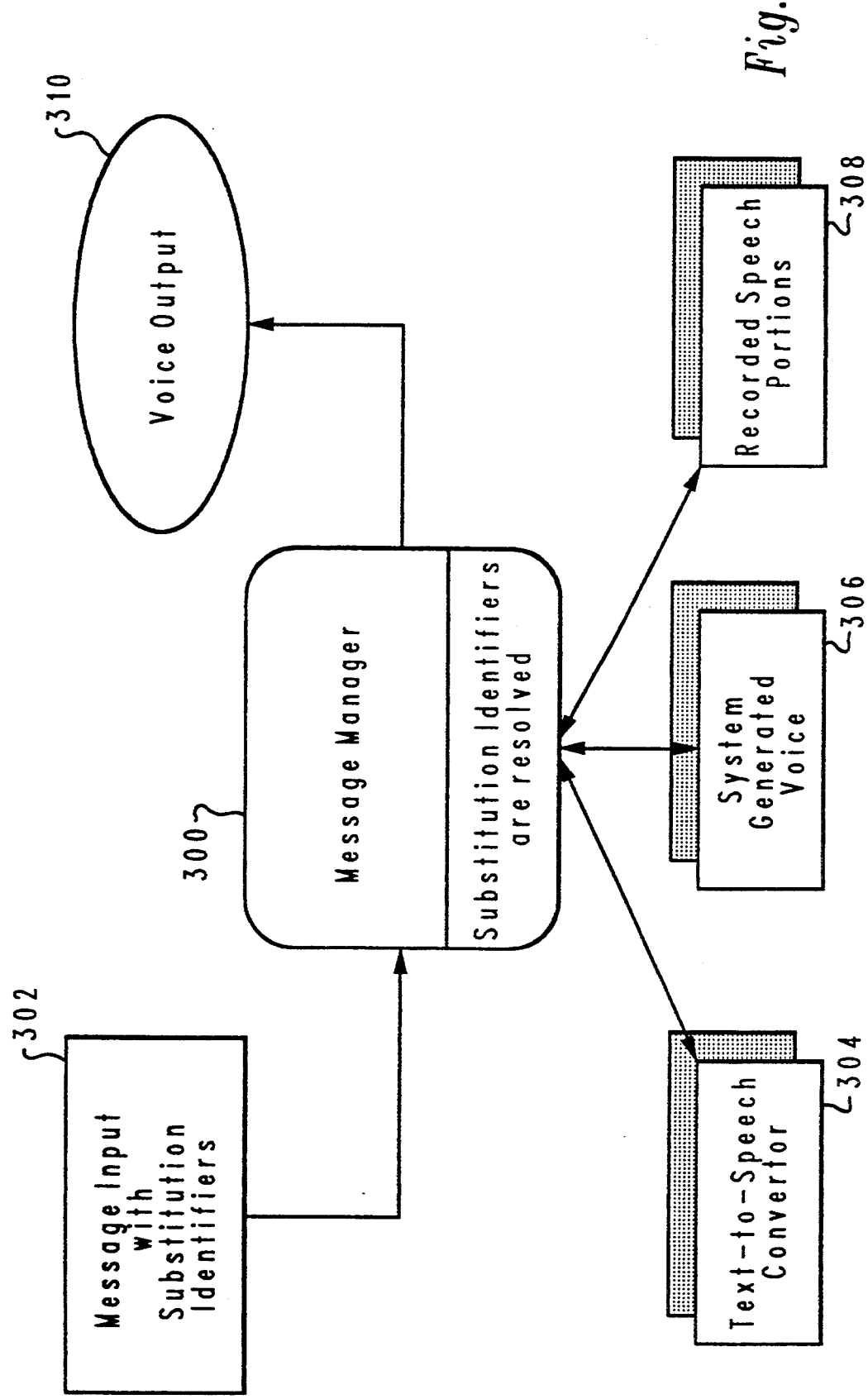
FIG. 3 depicts a block diagram of components in a method and system for generating a personalized or specific message in accordance with a preferred embodiment of the present invention.

With reference to FIG. 3, there is depicted a block diagram of components in a method and system for generating a personalized or specific message in accordance with a preferred embodiment of the present invention. FIG. 3 illustrates the steps taken to produce a specific message for presentation. In accordance with a preferred embodiment of the present invention, message manager 300 receives a message input with substitution identifiers from block 302. A query involves the initiation of a communications link between two parties. The substitution identifiers are resolved by message manager 300. The resolving of the substitution identifiers determines what audio phrases may be added to the message input. The appropriate output is produced by retrieving audio phrases, also called message portions, from text to speech converter 304, system generated voice 306, or recorded speech portions 308. Message manager 300 then provides an output to voice output block 310, which allows for presentation of the message.

In accordance with a preferred embodiment of the present invention, a method and system for enhancing phone messaging systems by allowing a user to specify one or more speech substitution identifiers within a recorded message to create a specific audio message is provided. Each substitution identifier ("SI") is specified with prearranged key sequences that may be entered on a telephone key pad at message record time, in accordance with a preferred embodiment of the present invention. Although the depicted embodiment employs a telephone keypad, other input devices such as, for example, a keyboard may be utilized for input. The SI's utilized in accordance with the preferred embodiment of the present invention are associated with audio phrases or audio parts which may have been either prerecorded segments of audios, or system generated, or generated from supplied text by a text-to-speech converter well known by those skilled in the art. The substitution identifiers are evaluated during message playback and are included, in positional or temporal sequence, within the prerecorded audio segment of the specific audio message.

In accordance with a preferred embodiment of the present invention, a user may specify one or more SI's within a recorded message. These SI's may be specified with prearranged key sequences that may be entered on a telephone key pad at message record time. A SI may be a structured reference combining five variables of information in accordance with a preferred embodiment of the present invention. The first variable is the identifier's key sequence utilized by the data processing system to uniquely distinguish the SI's from one another. Next, the second variable is the audio part type. This variable is utilized to determine the required method for resolving a substitution, i.e., text-to-speech, system generated, or prerecorded.. The audio part type may be, for example, a database of prerecorded audio segments, which may be stored in digital format, or textual data. The third variable serves as a pointer providing the location of the audio part type. A location may be, for example, an address in computer memory, a file name located on a computer resource, or a software application variable described by an address or a file name. The fourth variable represents a pointer to another SI and is optional in accordance with the preferred embodiment of the present invention. The fourth variable may be utilized to permit multiple speech sequence combinations. A fifth variable may be utilized to specify a window of time that is valid for a substitution identifier. A window of validity is the window of time during which a SI is valid.

The SI's placed within a prerecorded message may represent information received from various sources. For example, some systems keep current date and time information. A substitution identifier may be created to represent the data processing system date and/or time for inclusion in a user's specific audio message. Moreover, in accordance with a preferred embodiment of the present invention, users may provide a caller with auxiliary names and phone numbers which may include a pager, a backup person, a secondary location, a conference room, an after hours number(s), and a manager. A SI may also be utilized to represent a user's calendar information if the calling date and time coincide with a scheduled event, in accordance with a preferred embodiment of the present invention. In such a situation, the meeting topic text may be converted to speech and played as a result of the included SI in the recorded message.

If, for example, a user is on vacation, holiday, or personal absence, such a situation may be indicated with a SI placed within the specific audio message. Such a SI may be created with both a beginning and ending date and time, producing a window of time during which the SI is valid to control the duration for which the insertion of the audio phrase should occur.

For example, if a user desires to have the current date verbally presented to a user within a recorded audio message, the user may create a SI, represented by a specific key sequence, such as, for example, "#01". This SI may represent three sequential key strokes in accordance with a preferred embodiment of the present invention. During the message record time, the user may enter the "#01" key stroke sequence at the point within the message where the date should be presented. The "#" sign is the activation key and the "01" is the identification key sequence in this example. Following the key stroke sequence, the user may continue recording the rest of the message, including any other desired key stroke sequences at the appropriate locations. When the message is played as a result of a call or query by a caller, all SI's placed within the recorded message are then evaluated, .resulting in the current date being verbally presented at the location within the specific audio message where the SI was encountered by the data processing system.

Those of ordinary skill in the art will recognize that a variety of information sources are available and may exist in formats other than speech. Additionally, although the depicted embodiment is directed towards a phone messaging system, those skilled in the art will recognize that the present invention may be utilized in other data processing systems in which users desire to create specific messages.

For example, the present invention may be utilized in other data processing systems such as an electronic mail system, wherein communications links are established and audio objects dynamically modified by substitution identifiers may be sent and received. Although the depicted embodiment is a system that responds to queries from callers, a preferred embodiment of the present invention may also present specific audio messages in response to a signal not originating from a query. For example, specific audio messages may be sent by a data processing system at predetermined times or in response to selected events. A-query is the act of establishing a communication link for the purposes of receiving or exchanging information.

Figure 4:
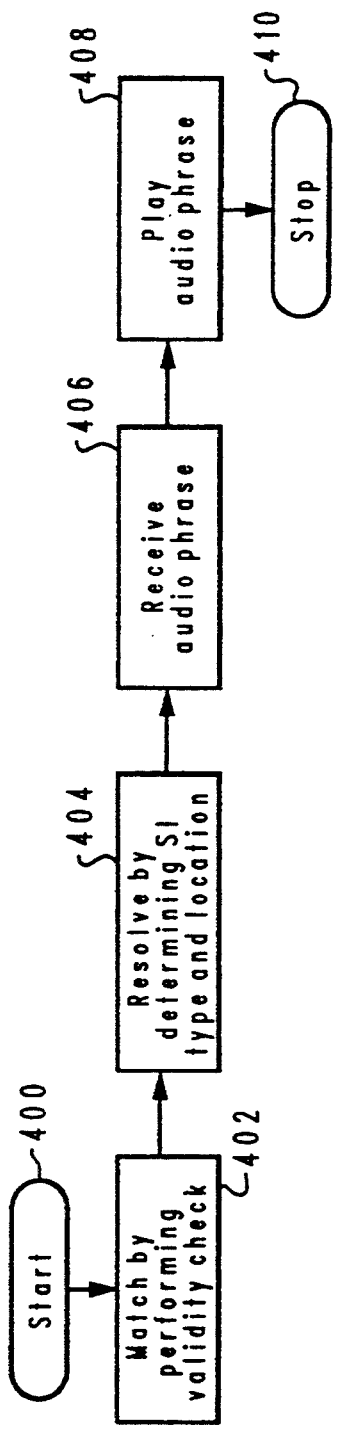
FIG. 4 is a high level flowchart of the method and system for message substitution processing in accordance with the preferred embodiment of the present invention.

Referring now to FIG. 4, there is depicted a high level flowchart of the method and system for message substitution processing in accordance with the preferred embodiment of the present invention. As illustrated, the process begins in block 400 and thereafter proceeds to block 402, which depicts the matching portion of the process. Matching also includes validity checking. When validity checking occurs, SI's that are determined to be valid are enabled for evaluation. Those SI's which are not valid are not evaluated. In this block, the key sequence to the substitution identifier table for all substitution identifiers is determined. Thereafter, the process proceeds to block 404, which illustrates the resolving portion of the process. In this block, the SI type and location to service is determined. For example, the service type may be text-to-speech conversion, system generated speech, or prerecorded saved speech, while the location may be in a database or file in a data storage device in a computer on site or in a data storage device in a computer at another site. A multitude of repositories may be utilized for locations to retrieve information to form and present an audio phrase that is associated with a substitution identifier in accordance with a preferred embodiment of the present invention.

Afterward, the process proceeds to block 406, which depicts the receive portion of the process. In this portion of the process, the substituted voice or audio phrase from the type service identified by the SI is received from the service. Thereafter, the process proceeds to block 408, which illustrates the play portion of the process. In this portion of the process, the audio phrase received from the service is audibly presented in place of the key sequence identifying the SI. Thereafter, the process terminates as depicted in block 410.

Figure 5:
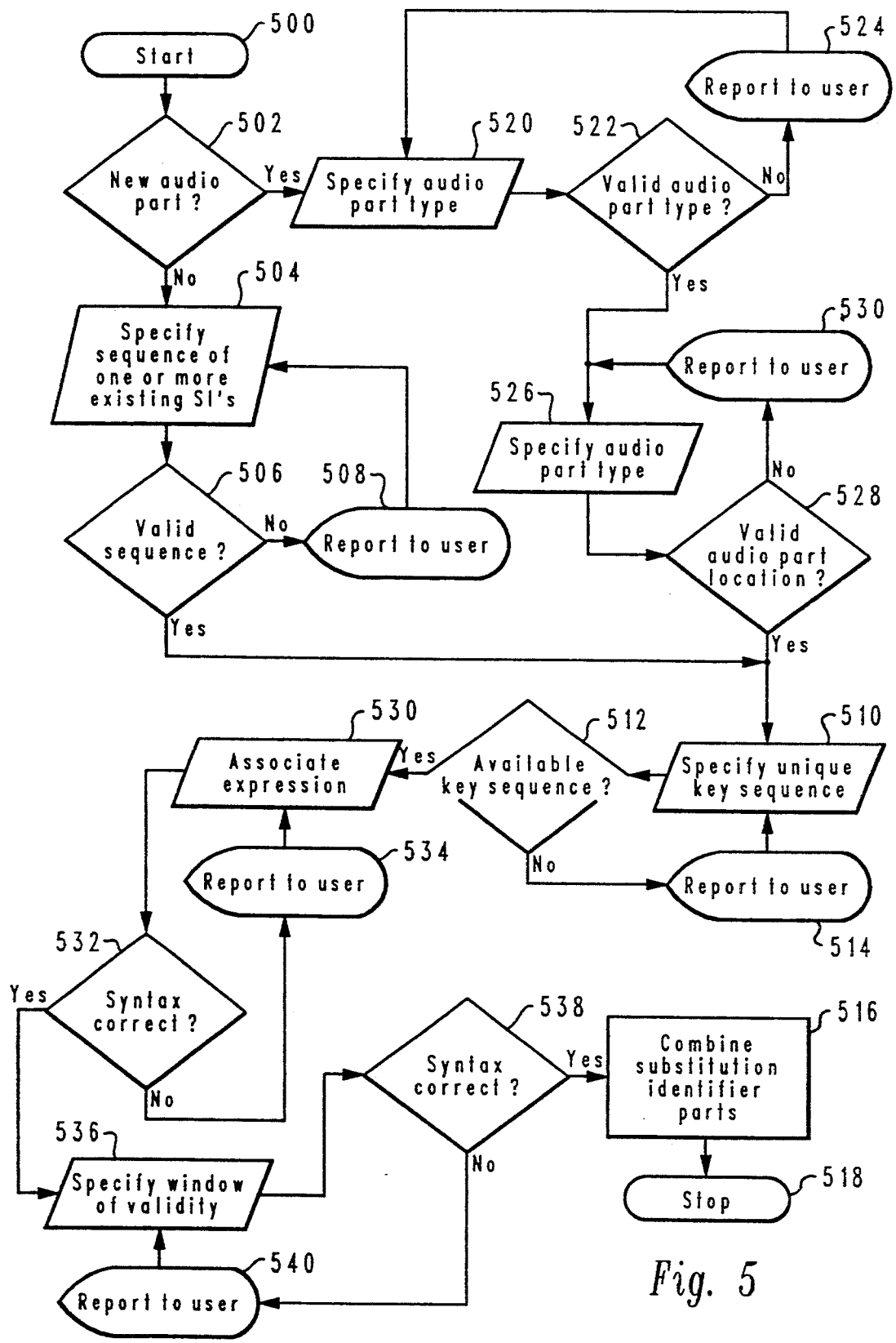
FIG. 5 depicts a high level flowchart of a method and system for substitution identifier creation in accordance with the preferred embodiment of the present invention.

With reference to FIG. 5, there is depicted a high level flowchart of a method and system for substitution identifier creation in accordance with the preferred embodiment of the present invention. In substitution identifier creation, other identifiers may be combined such that they may be represented through the use of a single unique identifier. This ability is accomplished through the use of the substitution identifier fourth variable information. New audio phrases also may be created for association with substitution identifiers during substitution identifier creation as illustrated in FIG. 5. As illustrated, the process begins at block 500 and thereafter proceeds to block 502, which depicts a determination of whether or not a new audio part or audio phrase is desired by the user. A substitution identifier ("SI") may be created by adding a new audio part or by specifying other SI's. If a new audio part is not desired by the user, the process then proceeds to block 504, which illustrates the specifying of the sequence of one or more existing SI's.

Thereafter, the process proceeds to block 506, which depicts a determination of whether or not the sequence of one or more SI's entered by the user is valid.

If a valid sequence of SI's has not been entered by the user, the process then proceeds to block 508, which illustrates the sending of a report to the user, which states that a valid sequence has not been entered. Afterwards, the process returns to block 504, allowing the user to specify another sequence of one or more existing SI's.

Referring back to block 506, if the SI sequence is valid, the process then proceeds to block 510, which illustrates the specifying a unique key sequence for a new SI. Thereafter, the process proceeds to block 512, which depicts a determination of whether or not the key sequence is valid and whether or not the key sequence is an available key sequence. If the key sequence is not valid or the key sequence is not an available key sequence, the process then proceeds to block 514, which illustrates reporting to the user that the key sequence was invalid and/or an unavailable key sequence. Thereafter, the process returns to block 510 to allow the user to specify another unique key sequence.

Referring back to block 512, if the key sequence is an available and valid key sequence, the process proceeds to block 530, which depicts the association of an expression with the key sequence. In accordance with a preferred embodiment of the present invention, whether or not a SI sequence is valid may be determined by reference to a table such as a SI association table illustrated by example below:

TABLE I

| SI Key | SI Expression |
|---|---|
| #01 | #02 = "value" AND #03 = #04 |
| #05 | #06! = "value" |

TABLE I-continued

| SI Key | SI Expression |
|---|---|
| #07 | ! |
| #08 | !(11/07/90_12:00→ 11/05/92_14:00) |
| #09 | SYSTEM_DATE_TIME > 11/08/91_17:30 |

The SI keys in the table are valid by default. Consequently, SI keys not found in the table are considered valid in accordance with a preferred embodiment of the present invention. SI keys may be set equal to a value or compared to some value, such as, for example, whether the SI key is within a certain period of time. A value may be for example, a memory address to an audio segment, a memory address to a system generated date, a text string, a file name, textual matters audio segment, a string where the SI may be compared, as where the audio segment may be compared. The symbol "!" means a logical NOT. A "!" by itself means that the key is never valid. Other operators may be utilized, such as, for example, "|" for OR, "<" for less than, ">" for greater than, etc .... A sequence of SI's may be utilized by a user in accordance with a preferred embodiment of the present invention to produce complex audio messages.

A window of time or validity may be specified as shown in SI key "#08" in Table 1, where the first "date/time", 11/07/90_12:00, specifies the beginning of the window and the second "date/time", 11/05/92_14:00, specifies the end of the window. SI key #09 illustrates comparing the system date/time to a date/time selected by the user. In this case, the SI key is valid if the system date/time is greater than 11/08/91, 17:30. In this manner, a user may specify a window of validity utilizing expressions as illustrated in Table 1. This window of validity may be specified by a condition; i.e., #02=#08 AND #09. Alternatively, the window of validity may be simply specified by a time; i.e., after 17:00.

Thereafter, the process proceeds to block 532, which illustrates a determination of whether or not the syntax of the expression associated with the key sequence is correct. Syntax may be incorrect if the user does not follow the format specified by the data processing system. If the syntax is not correct, the process proceeds to block 534, which illustrates reporting to the user that an incorrect syntax has been entered for the expression. Thereafter, the process returns to block 530, to allow the user to correct or enter another expression.

Referring back to block 532, if the syntax is correct, then the process proceeds to block 536, which depicts the specifying of a window of validity, during which the key sequence is valid. The key sequence is valid if the time during which the key sequence is activated is within the time frame specified by the window of validity. Thereafter, the process proceeds to block 538, which illustrates a determination of whether or not the syntax for the window of validity specified by the user is correct. Syntax may be incorrect if the user does not follow the format defined by the data processing system for entering a window of validity. If the syntax is incorrect, the process proceeds to block 540, which illustrates reporting to the user that incorrect syntax has been entered for the window of validity. Thereafter, the process returns to block 536, to allow the user to correct or enter another window of validity.

Referring back to block 538, if the syntax is correct, then the process proceeds to block 516, which depicts the combining of the SI parts. Thereafter, the process terminates as illustrated in block 518.

Referring back to block 502, if a new audio part is desired by the user, the process then proceeds to block 520, which illustrates the specification of the audio part type. Thereafter, the process proceeds to block 522, which depicts a determination of whether or not the audio part type is valid. An audio part type is valid if the audio part type is available for use by a user. If the audio part type is not valid then the process proceeds to block 524, which illustrates reporting to the user that the speech type is invalid. Afterwards, the process returns to block 520 to allow the user to specify another audio part or audio phrase type.

Referring back to block 522, if the audio part type is valid, then the process proceeds to block 526, which depicts the specification of the audio part location. Thereafter, the process proceeds to block 528, which illustrates a determination of whether or not the audio part location is valid. If the audio part location is not valid, the process then proceeds to block 530, which depicts reporting to the user that audio part location is invalid. Thereafter, the process returns to block 526 so that the user may specify another audio part location.

Referring back to block 528, if the audio part location is valid, then the process proceeds to block 510, which illustrates the specification of a key sequence for a SI for the audio part by the user. Next, the process proceeds to block 512, which depicts a determination of whether or not the key sequence is valid and whether or not the key sequence is available. If the key sequence is not valid and/or is unavailable, the process then proceeds to block 514, which illustrates the reporting of the invalidity and/or unavailability of the key sequence to the user. Thereafter, the process returns to block 510 to allow the user to specify another key sequence.

Referring back to block 512, if the key sequence is an available key sequence, the process proceeds to block 530, which depicts the association of an expression with the key sequence. Thereafter, the process proceeds to block 532, which illustrates a determination of whether or not the syntax of the expression associated with the key sequence is correct. If the syntax is not correct, the process proceeds to block 534, which illustrates reporting to the user that an incorrect syntax has been entered for the expression. Thereafter, the process returns to block 530, to allow the user to correct or enter another expression.

Referring back to block 532, if the syntax is correct, the process proceeds to block 536, which depicts the specifying of a window of validity, during which the key sequence is valid. Thereafter, the process proceeds to block 538, which illustrates a determination of whether or not the syntax for the window of validity specified by the user is correct. If the syntax is incorrect, the process proceeds to block 540, which illustrates reporting to the user that incorrect syntax has been entered for the window of validity. Thereafter, the process returns to block 536, to allow the user to correct or enter another window of validity.

Referring back to block 538, if the syntax is correct, the process then proceeds to block 516, which depicts the combining of the substitution identifier parts. Thereafter, the process terminates as illustrated in block 518.

In FIG. 5, in all blocks requiring user input, a null response may be utilized by the user to cause the flow to terminate in block 518 except for user input in blocks 530 and 536, which involve associated expressions with the key sequence and specifying a window of validity. For these blocks a null response is considered correct syntax.

As a result, a user may create SI's by specifying an audio part to be associated with a particular SI or the user may create a SI by entering a sequence of one or more pre-existing SI's in accordance with a preferred embodiment of the present invention. By utilizing a sequence of SI's with various values, complex audio messages with several levels of SI's may be created. The act of determining a SI's validity through a window of validity through an expression and/or subsequently generating audio parts from valid SI's for insertion into the audio message is defined as the act of elaborating a SI.

Figure 6:
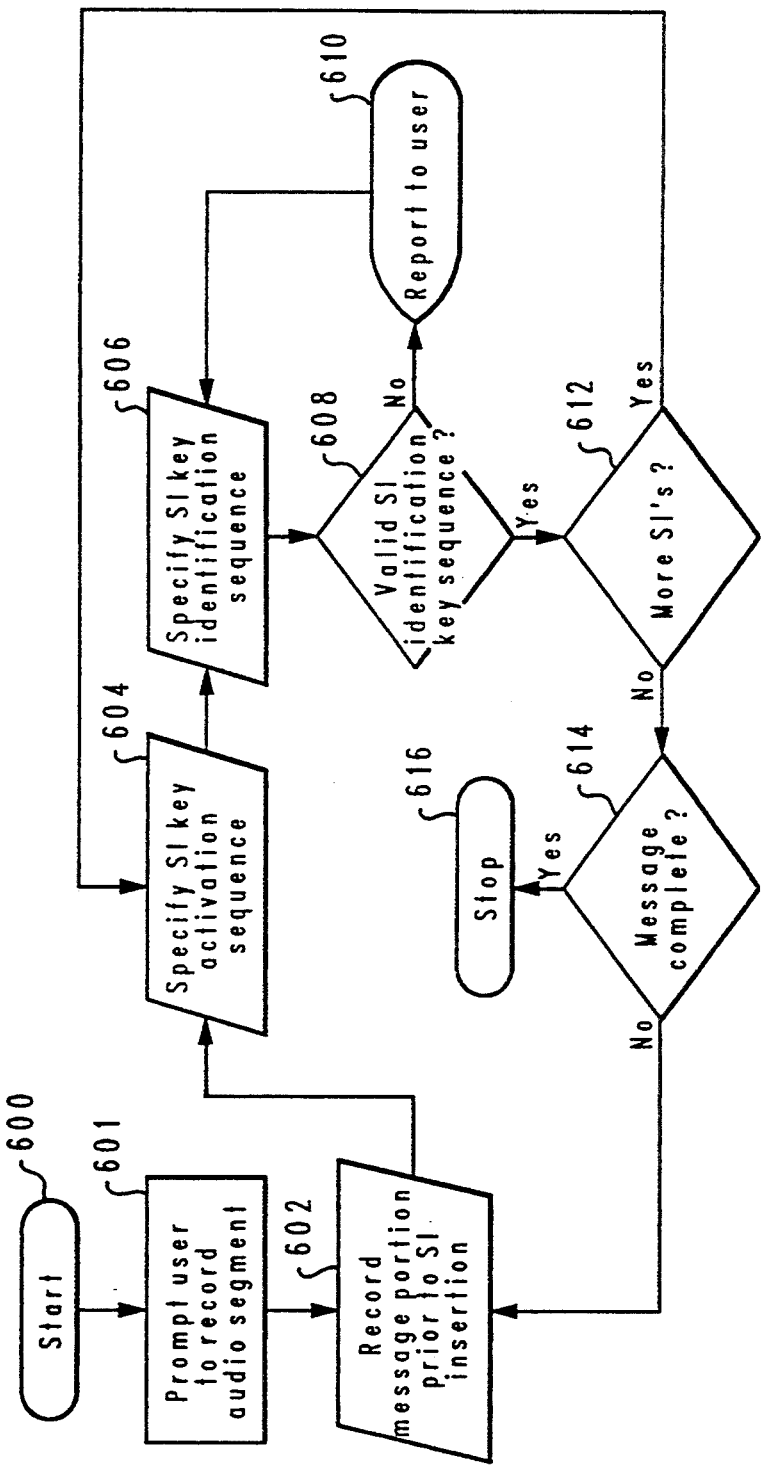
FIG. 6 is a high level flowchart of a method and system for substitution identifier selection in accordance with a preferred embodiment with the present invention.

Referring now to FIG. 6, there is depicted a high level flowchart of a method and system for substitution identifier selection in accordance with a preferred embodiment with the present invention. Substitution identifiers selection is the process by which a user creates a recorded message and inserts desired substitution identifiers. As illustrated, the process begins in block 600 and thereafter proceeds to block 601, which illustrates prompting the user to record an audio segment. The process then proceeds to block 602, which depicts going into create parent message mode, wherein a user may record an audio segment or enter one and/or more SI's. A user employing a method and system as illustrated in FIG. 6 may specify a position within the audio message for a substitution identifier. A user at any time may enter the unique key sequence representing a substitution identifier while recording the message portion. Entering an activation key sequence followed by the identification key sequence will cause the method and system in FIG. 5 to evaluate a corresponding substitution identifier at that point in the message.

Next, the process proceeds to block 604, which illustrates the specification of the SI key activation sequence. A SI key activation sequence is a sequence of one or more characters or key strokes that are utilized to indicate that the beginning of a SI is present, i.e., "#". The process then proceeds to block 606, which depicts the specification of the SI key identification sequence. An identification sequence is one or more characters or keys utilized to uniquely identify SI's. Thereafter, the process proceeds to block 608, which illustrates a determination of whether or not the SI key identification sequence is valid. A SI key sequence is examined to determine whether the sequences is in the format specified by the data processing system and whether the sequence is known to the system. If the format is not followed, the sequence may be invalid. The sequence also may be invalid if the sequence is not present within the data processing system. If the SI key identification sequence is not valid, the process proceeds to block 610, which depicts reporting to the user that the SI key is invalid. Thereafter, the process returns to block 600 to allow the user to specify another SI key identification, sequence.

Referring back to block 608, if the SI key identification sequence is valid, the process then proceeds to block 612, which illustrates a determination of whether or not the user desires to enter an additional SI. If the user enters another SI into the audio message, the process then returns to block 604 to allow the user to enter the SI key activation sequence for the next SI.

Referring back to block 612, if more SI's are not entered, the process then proceeds to block 614, which depicts a determination of whether or not the audio message is complete. If the audio message is not complete, the process then proceeds to block 602, which illustrates the recording of another portion or audio segment of the audio message. Thereafter, the process returns to block 604 for a specification of a SI key activation sequence.

Referring back to block 614, if the audio message is complete, the process terminates as illustrated in block 616.

Figure 7:
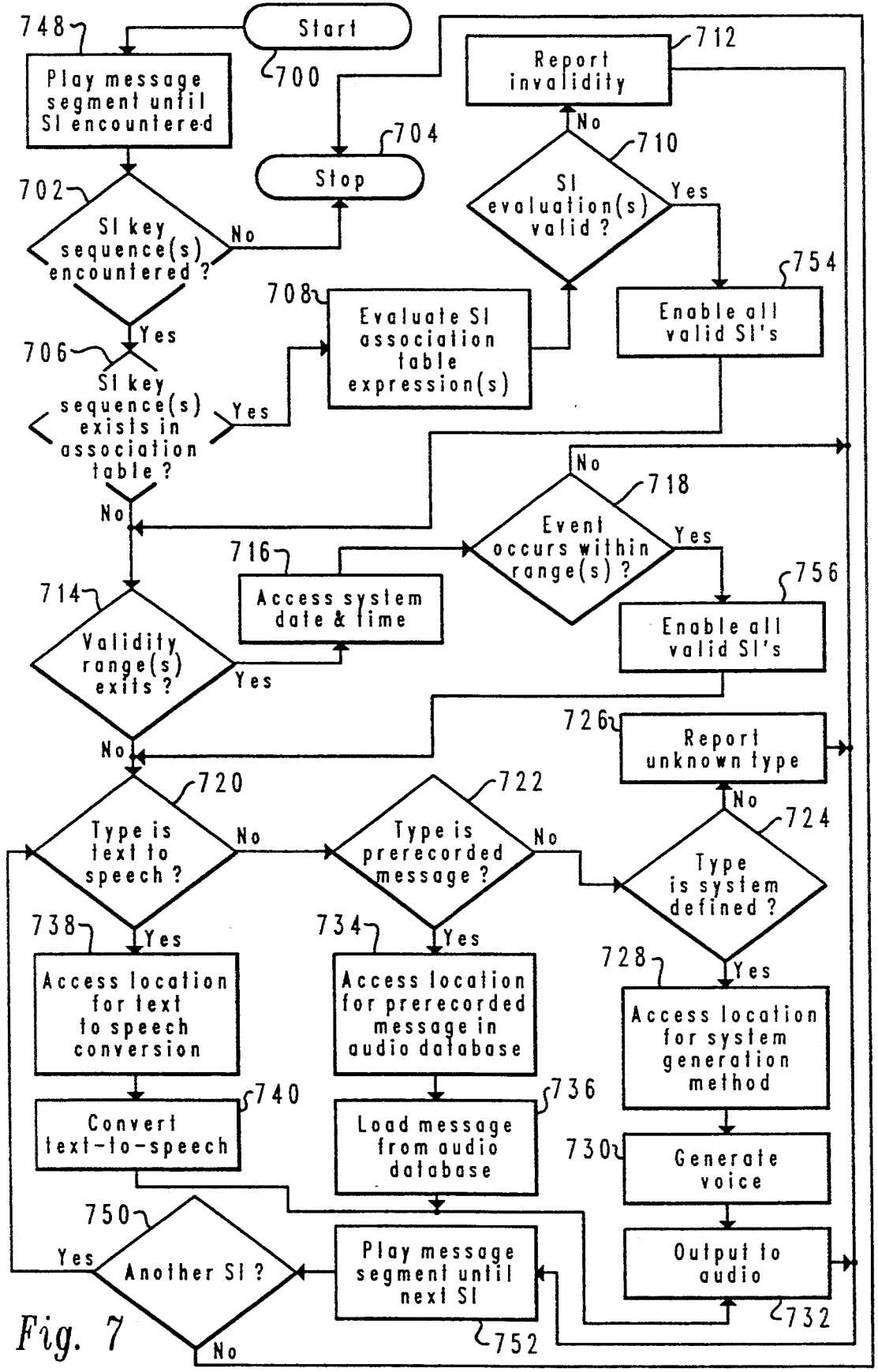
FIG. 7 depicts a high level flowchart of a method and system for substitution identifier activation in accordance with a preferred embodiment of the present invention.

With reference to FIG. 7, there is depicted a high level flowchart of a method and system for substitution identifier activation in accordance with a preferred embodiment of the present invention. This process is utilized to generate and present the audio phrases that may be associated with a SI. The process then combines the audio phrases with any audio segments to produce a specific message for presentation to a caller.

As illustrated, the process begins in block 700 and thereafter proceeds to block 748, which depicts the playing of the message for audio segment until a SI is encountered. The process then proceeds to block 702, which depicts a determination of whether or not a substitution identifier ("SI") key sequence has been encountered. More than one SI key sequence may be encountered. If a SI key sequence has not been encountered, the message finishes playing and the process then terminates as illustrated in block 704. Referring back to block 702, if one or more SI key sequences have been encountered, the process then proceeds to block 706, which depicts a determination of whether or not the SI key sequences encountered exist in the association table. If the SI key sequences exist in the association table, the process then proceeds to block 708, which illustrates the evaluation of the SI association table expressions corresponding to each SI key sequence. These SI association table expressions are the expressions created in block 530 in FIG. 5.

Thereafter, the process proceeds to block 710, which depicts a determination of whether or not the SI evaluation is valid. If the SI evaluation is valid, the process proceeds to block 754, which illustrates the enabling of all valid SI's. Only enabled substitution identifiers pass on from block 754 to block 714. All other SI's are not checked. The process then proceeds to block 714, which depicts a determination of whether or not a validity range exists. The default if no validity range exists for a SI is that the SI is valid for all times. Referring again to block 706, if the SI key sequences do not exist in the association table, then the process proceeds directly to block 714. If a validity range exists, the process proceeds to block 716, which illustrates the accessing of the system date and time. Thereafter, the process proceeds to block 718, which depicts a determination of whether or not the event occurs within the validity range. If the event is within the validity range, the process proceeds to block 756, which depicts the enabling of all valid SI's.

Thereafter, the process proceeds to block 720, which illustrates a determination of whether or not the type of next enabled SI is text-to-speech. The process also proceeds to block 720 if a validity range does not exist in block 714. If the type is not text-to-speech, the process proceeds to block 722, which depicts a determination of whether or not the type is a prerecorded message. If the type is not a prerecorded message, the process then proceeds to block 724, which illustrates a determination of whether or not the type is system defined. If the type is not system defined, the process proceeds to block 726, which depicts the reporting that an unknown type exists to the data processing. Thereafter, the process proceeds to block 752, which illustrates the playing of the next recorded message segment until another SI is encountered or the message has been played in its entirety. Thereafter, the process proceeds to block 750, which illustrates a determination of whether or not another SI exists. If another SI does not exist, the process terminates as illustrated in block 704.

Referring back to block 750, if another SI exists, the process returns to block 720, where the evaluation of the next SI encountered is processed.

Referring back to block 724, if the type is system defined, the process proceeds to block 728, which illustrates the accessing of the location for the system generation method. Thereafter, the process proceeds to block 730, which ,depicts generation of the voice. Then, the process proceeds to block 732, which illustrates the output of the audio phrase to audio for presentation. Thereafter, the process returns to block 752 to play the message segment until another SI is encountered. Thereafter, the process proceeds to block 750 for a determination of whether or not another SI exists. If another SI exists, the process returns to block 720 for further processing of the SI. If another SI does not exist, the process terminates as illustrated in block 704.

Referring back to block 722, if the type is a prerecorded message, then the process proceeds to block 734, which depicts the accessing of a location with a prerecorded message in an audio database. Thereafter, the process proceeds to block 736, which illustrates the loading or retrieving of the message from the audio database. Afterward, the process proceeds to block 732, which illustrates the output of the message to audio for presentation to the caller. Thereafter, the process proceeds to block 752 to play the following recorded message segment until another SI is encountered. Thereafter, the process proceeds to block 750 for a determination of whether or not another SI exists.

Referring back to block 720, if the type is text-to-speech, the process then proceeds to block 738, which depicts the accessing of a location for text-to-speech conversion. Thereafter, the process proceeds to block 740, which illustrates the converting of the text-to-speech. Afterward, the process proceeds to block 732, which illustrates the output to audio for presentation. Thereafter, the process proceeds to block 752 to play the message segment until another SI is encountered. Thereafter, the process proceeds to block 750 for a determination of whether or not another SI exists.

Referring back to block 710, if the SI evaluations are not valid, the process proceeds to block 712, which depicts the reporting of the invalidity to the data processing system. Thereafter, the process proceeds to block 752, which depicts the playing of the message segment until the next SI is encountered.

Referring back to block 718, if the event does not occur within the range or ranges specified, the process then proceeds to block 752 to play the message or audio segment until the next SI is encountered. In both cases, if another SI is not encountered, the process terminates as illustrated in block 704. If another SI is encountered, the process returns to block 720 to process the SI.

In FIG. 7, all of the SI's encountered after a message or audio segment are evaluated for validity of the expressions associated with the SI's and to determine whether or not validity ranges exist for the SI's. Afterwards, each SI is converted into a audio phrase to be output to audio to the caller, one at a time.

The present invention allows for the personalization or customizing of a user's audio message in a phone messaging system with various information that may change daily, i.e., the current date, or at other intervals that may or may not be fixed without the necessity of rerecording the customized message on a daily basis. Additionally, the customized audio message may change depending on the time of the day or with a particular day of the week or of the month.

For example, a user may create a specific audio message including temporary auxiliary phone numbers without having to change the audio message every time the phone number changes. The phone number assigned to a SI may be changed without having to rerecord the message.

In another example, a user may create an audio message with a segment stating: "I am away from my desk". A first SI has a window of time that is valid between 12:30 pm and 1:30 pm and may be associated with an audio phrase: "I am at lunch and will return by 1:30". A second SI may be utilized if the first SI is not valid and may be associated with an audio phrase that is silent, in accordance with a preferred embodiment of the present invention. If a caller makes a query to the user's phone during the time the first SI is valid, the audio message presented to the caller will be: "I am away from my desk. I am at lunch and will return by 1:30".

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for creating a specific message for playback wherein said data processing system includes a multitude of diverse data types stored therein, said specific message comprising at least one audio segment associated with at least one of a plurality of unique identifiers located within said specific message, wherein each of said plurality of unique identifiers includes a specification of a particular audio phrase to be returned for presentation, said method comprising:
   in response to a signal, presenting said specific message by automatically retrieving said particular audio phrase specified by said at least one of said plurality of unique identifiers from said multitude of data types; and
   dynamically substituting said particular audio phrase specified by at least one of said plurality of unique identifiers for said at least one of said plurality of unique identifiers while presenting said specific message, wherein said specific message includes said at least one audio segment and said particular audio phrase.

2. The method of claim 1 further comprising associating a particular data type with a unique identifier in response to said user entering said specification.

3. The method of claim 1 further comprising prompting said user to specify at least one unique identifier for association with said at least one audio segment.

4. The method of claim 1, wherein said signal is a query from a caller.

5. The method of claim 1, wherein said signal is from said data processing system.

6. The method of claim 1, wherein one of said multitude of diverse data types is a database of prerecorded audio segments.

7. The method of claim 6, wherein said prerecorded audio segments in said database are stored in a digital format.

8. The method of claim 1, wherein one of said multitude of diverse data types is text stored in a file which is converted to speech to form an audio phrase for said presentation.

9. A method in a data processing system for creating a specific message for playback, said specific message comprising at least one audio segment and a unique identifier located within said specific message, wherein said unique identifier includes a selected window of time during which said unique identifier is valid, said unique identifier being associated with a message portion, said method comprising:
   recording of said at least one audio segment by a user;
   in response to a signal at a particular time, retrieving said unique identifier;
   in response to said particular time being within said selected window of time, retrieving said message portion associated with said unique identifier; and
   presenting said specific message by dynamically presenting said at least one audio segment and dynamically substituting said message portion associated with said unique identifier for said unique identifier while presenting said specific message if said particular time is within said selected window of time, otherwise only presenting said at least one audio segment.

10. The method of claim 9 further comprising associating with said at least one audio segment, said unique identifier.

11. A data processing system for creating a specific audio message for playback, said data processing system including a multitude of diverse data types stored therein, said specific audio message comprising at least one audio segment associated with at least one of a plurality of unique identifiers, each of said plurality of unique identifiers includes a specification of a particular audio phrase to be returned for presentation to a caller, said data processing system comprising:
   in response to a signal, means for presenting said specific message by automatically retrieving said particular audio phrase specified by said at least one of said plurality of unique identifiers from said multitude of data types; and
   means for dynamically substituting said audio phrase specified said at least one of said plurality of unique identifiers for said at least one of said plurality of unique identifiers while presenting said specific message, wherein said specific message includes said at least one audio segment and said particular audio phrase.

12. The data processing system of claim 11 further comprising means for associating a particular data type with a unique identifier in response to said user entering said specification.

13. The data processing system of claim 11, wherein one of said multitude of diverse data types is a database of Prerecorded audio segments.

14. The data processing system of claim 13, wherein said prerecorded audio segments in said database are stored in a digital format.

15. The data processing system of claim 14, wherein one of said multitude of diverse data types is text stored in a file that is converted to speech to form an audio phrase for said presentation.

16. A data processing system for creating a specific audio message for playback, said specific message comprising at least one audio segment and a first unique identifier located within said specific message, wherein said unique identifier includes a selected window of time during which said unique identifier is valid, said unique identifier being associated with a message portion, said data processing system comprising:

means for recording of said at least one audio segment by a user;

in response to a query from a caller at a particular time, means for retrieving said unique identifier;

in response to said particular time being within said selected window of time, means for retrieving said message portion associated with said unique identifier;

means for presenting said specific message by dynamically presenting said at least one audio segment and dynamically substituting said message portion associated with said unique identifier for said unique identifier while presenting said specific message if said particular time is within said selected window of time, otherwise only presenting said at least one audio segment.

17. The data processing system of claim 16 further comprising means for associating with said at least one audio segment, said unique identifier.

* * * * *

UNITED STATES PATENT AND TRADEMARK OFFICE
CERTIFICATE OF CORRECTION

PATENT NO. : 5,434,910
DATED : July 18, 1995
INVENTOR(S) : Johnson et al.

It is certified that error appears in the above-indentified patent and that said Letters Patent is hereby corrected as shown below:

--Column 7, line 20-- change "fourth" to --for--

Signed and Sealed this

Second Day of April, 1996

Attest:

BRUCE LEHMAN

Attesting Officer

Commissioner of Patents and Trademarks